United States Patent [19]

Spydevold

[11] Patent Number: 5,667,740
[45] Date of Patent: Sep. 16, 1997

[54] PROCESS FOR THE PRODUCTION OF PRODUCTS OF LIGHT CELLULAR PLASTIC WITH CLOSED CELLS

[75] Inventor: Steinar Spydevold, Høvik, Norway

[73] Assignee: Polynor Partners A/S, Oslo, Norway

[21] Appl. No.: 615,258

[22] PCT Filed: Sep. 14, 1994

[86] PCT No.: PCT/NO94/00153

§ 371 Date: Mar. 4, 1996

§ 102(e) Date: Mar. 4, 1996

[87] PCT Pub. No.: WO95/07812

PCT Pub. Date: Mar. 23, 1995

[30] Foreign Application Priority Data

Sep. 15, 1993 [NO] Norway .................. 933294

[51] Int. Cl.$^6$ ................................. B29C 44/02
[52] U.S. Cl. ................... 264/54; 264/45.5; 264/51
[58] Field of Search ............... 264/45.5, 54, 328.7, 264/51

[56] References Cited

U.S. PATENT DOCUMENTS

| 4,181,647 | 1/1980 | Beach | 264/54 |
| 4,473,516 | 9/1984 | Hunerberg | 264/45.5 |
| 4,507,255 | 3/1985 | Shizawa | 264/54 |
| 4,746,478 | 5/1988 | Fujisaki et al. | 264/54 |
| 4,892,691 | 1/1990 | Kolossow | 264/54 |
| 5,049,327 | 9/1991 | Hara et al. | 264/45.5 |
| 5,277,852 | 1/1994 | Spydevold | 264/54 |
| 5,474,723 | 12/1995 | Horikoshi | 264/54 |

FOREIGN PATENT DOCUMENTS

| 8602036 | 10/1986 | WIPO . |
| 8801934 | 3/1988 | WIPO . |

*Primary Examiner*—Allan R. Kuhns
*Attorney, Agent, or Firm*—Merchant, Gould, Smith, Edell, Welter & Schmidt, P.A.

[57] ABSTRACT

A process for the production of products of light cellular plastic with closed cells from a plastic composition containing chemical blowing agent and, optionally, other process-regulative substances and additives, where the plastic composition is processed (kneaded) mechanically in a plastic processing machine to a well homogenized, melted plastic compound, and that the plastic compound is then pressed into a closed cavity, at a temperature above the decomposition temperature for the chemical blowing agent in the plastic compound, in combination with possible decomposition regulative additives.

4 Claims, No Drawings

PROCESS FOR THE PRODUCTION OF PRODUCTS OF LIGHT CELLULAR PLASTIC WITH CLOSED CELLS

PRIOR ART

Cellular plastics/foamed plastics can be divided into two main groups:

1) Those having predominantly closed cells;
2) Those having predominantly open cells.

Closed cells in the plastic foam (i.e., cells which are not joined together) are a necessary condition if the foam is not to absorb moisture. It is also very important that the cells be closed if it is required that the cellular plastic have good, long-lasting thermal insulation properties. Also, the mechanical strength properties of the cellular plastic will generally be far better if the gas cells are closed, compared with cellular plastic with open cells, i.e., where the gas cells are joined together (e.g., as in a sponge).

There are several principally different technologies for producing foamed plastic with closed gas cells. It is conditional for all processes that the plastic not be sheared, i.e., that the layers of the plastic compound do not move in relation to one another after the blowing agent has expanded in the plastic compound and before the cell walls in the plastic compound have become sufficiently strong, either by chemical reation or by cooling, to prevent the cells from being torn to pieces by shearing. When a physical blowing agent is used, it is a condition that the gas be mixed into the plastic compound at a pressure above the expansion pressure of the gas, i.e., that the gas be mixed into the plastic compound in liquid form. If the gas has been permitted to expand before, or in connection with, being blended into the plastic compound, the result will be a greater or lesser portion of the plastic foam having open, continuous cells. When a chemical blowing agent is used, it is a condition for attaining foam with closed cells that the decomposition of the blowing agent should take place under a pressure great enough to prevent expansion of the gas until the entire decomposition phase has been completed. If the decomposition takes place under too low a pressure, the result will be foam with open gas cells.

One frequently used process is reaction injection moulding (RIM). In this process, two or more liquid components are mixed together and injected into a closed mold cavity. Polyurethane (PUR) is used for the most part in this process, but other plastic raw materials such as, e.g., thermoplastic polyamide, polyester and epoxy are also used. The method has the major advantage, compared with most other processes, of enabling the production of very large products, and allowing the plastic to be foamed at the place of usage (in situ). PUR foam can be produced with low density and has a very good thermal insulating capability as long as moisture has not penetrated into the foam. However, the foam is relatively expensive, it is brittle, and its compression strength is limited. Moreover, the gas cells collapse at very low fluid pressure, severely limiting the insulating property of the foam under water. The foam also has enviromentally negative sides. (One of the components of the foam is isocyanate. Currently, there is also an extensive use of CFC gases as the blowing agent in the foam.)

Of other known processes used especially for foaming of thermoplastics into light cellular plastic with closed cells, we can mention, in particular: static processes, extrusion processes, and injection molding processes.

Among static processes, the "Styropor process" is the most well known. It was developed especially for polystyrene and utilizes a volatile carbon-hydrogen compound as the foaming agent. The foam may be produced with very low densities and may be foamed at the place of use. Its fire and chemical properties, however, are in many cases inadequate. Moreover, the mechanical properties are relatively limited. The process can be used for production of large foam products.

Another type of static process frequently used is the so-called "static high pressure method". This process is used primarily for production of light PVC foam with a chemical blowing agent. The foam can be produced with low density (about 30 g/cm$^3$), has a closed, uniform cell structure and has very good mechanical and chemical properties. In terms of dimension, however, this process has major limitations, it is quite manual, and production costs are high.

A variation of this process is the injection molding of unexpanded "tablets" of thermoplastic containing a chemical blowing agent, which are then placed in presses where the "tablets" are heated up, causing the blowing agent to decompose. The hardness of the product is normally very limited and the production is slow.

A process used particularly for production of foam products from ethylene vinyl acetate (EVA) is to inject a product having a mass temperature below the decomposition temperature for the blowing agent into an injection mold. The mold is filled entirely with the plastic compound, and a pressure higher than the expansion pressure for the blowing agent is applied to the compound. The mould—and with it the plastic compound—is then heated to above the decomposition temperature for the blowing agent system in the compound. After the blowing agent has decomposed, the mold is opened and the plastic expands directly. The process is very sensitive to variations in the process conditions, and it is slow.

There are also several known extrusion methods for production of cellular plastic. A condition for the attainment of closed gas cells is that the blowing agent in the plastic compound must not be expanded in the actual extrusion machine or in a first section of the molding tool (the nozzle). To attain a pressure in the plastic compound that is sufficient to prevent the expansion of the gas, flow friction through the nozzle is used almost exclusively. This produces variations in the velocity of the plastic compound at the outlet of the nozzle, which again means that shearing is built into the plastic compound, inasmuch as the expansion gas—as a result of pressure drop—expands. This results in cells easily being torn apart and to collapse of the expanded plastic compound after a short time. The "Celuka process", "Armocel process", and "Woodlite process" are examples of the build-up of the necessary mass pressure with the aid of friction. In order to avoid excessive shearing of the plastic compound and puncturing of the gas cells at the outlet of the nozzle, the amount of added blowing agent may be reduced, resulting in higher density. Extrusion of very thin profiles (foils) yields a flatter velocity profile (fewer variations in velocity of the plastic compound) through the mouth of the nozzle, and the problems of shearing of the plastic compound with tearing of the cells can thereby be reduced. By using a physical propellant gas instead of a chemical blowing agent, the pressure in the plastic melt can be reduced because the gas pressure is far lower in the physical gases normally used than in chemical blowing agents. Shearing of the plastic by friction can thereby be decreased. The problems of shearing of the plastic melt may also be reduced by regulating the viscosity of the melt, e.g., through temperature control or by utilizing cross-linking of the plastic in connection with the foaming.

There are also found extrusion methods for the production of light foam products having closed cells that do not utilize friction in the nozzle in order to obtain the necessary pressure. An example of this is the "BASF process", where the plastic compound is extruded into a vessel that is placed under pressure. The compound is then injected out of the container. This is a semi-continuous process, with a natural limitation on the product's dimensions. In the "Scandinor process" for production of light cellular plastic with closed cells the necessary mass pressure is built up by cooling down the plastic compound under high pressure in a special refrigeration unit with exterior cooling after the exit from the mold nozzle and transferring it directly into a braking/retaining device where the plastic compound itself forms a continuous "piston". The "piston" is slowed down to a velocity that imparts the necessary pressure to the plastic melt in the machine and in the nozzle. The pressure build-up is attained without velocity variations in the plastic melt. After the braking/retaining device, the plastic compound is heated up again, and the compound can expand without shearing of the gas cells. Various thermomoplastics may be used, but the braking/retaining device is a relatively complicated unit.

Injection molding of light cellular plastic with closed cells is done today by various processes, and the product can normally be referred to as structural foam. The injection molding process is usually divided into two main groups: low pressure processes and high pressure processes. There is attained up to about a 40% reduction of the foam's density compared with the density of the unexpanded plastic melt. Both physical as well as chemical blowing agents are used in connection with injection moulding of cellular plastic.

The low pressure processes are characterized by the fact that the compound containing gas is injected rapidly into the cavity of the tool. The amount of the injected compound has, at the start, a smaller volume than the cavity, whereby the plastic compound is allowed to foam up until it fills the entire cavity. It is common to fill the tool cavity 70–80% full. Due to the low pressure in the tool, the costs of the tool are relatively favorable. Foam products produced with a low pressure process usually have a non-uniform foam structure, many open cells and uneven surface, full of burst gas cells or slips. Attempts have been made to remedy this by means of control of the tool temperature, special processing of the tool cavity surface, and after-treatment of the foam product.

In the high pressure processes the plastic compound containing gas is rapidly injected at high pressure into the tool mold that is filled entirely with plastic compound. A skin on the product is obtained by cooling down the surface in the tool, and the plastic compound expands by virtue of the fact that the mold volume is increased. This is done, for example, by drawing the mold plates in the tool away from each other after all the plastic compound has been placed into the cavity. This process yields a relatively good surface on the product, so that after-treatment is often unnecessary. Further, it produces foam products having essentially closed, evenly distributed gas cells. The degree of expansion of the plastic can be varied to a certain extent with the product of this method. The tool molds for this process are relatively complicated, and the reduction of the density is limited. A variation based on the high pressure principle is the "Allied Chemical process". Here, the pressure is reduced so that the plastic compound can expand, by allowing a portion of the plastic compound, after filling, to flow back into the injection molding machine. The method produces an uneven cell structure. Another known process that is based on the high pressure principle is the "TAF method". After filling the cavity at a high mass pressure, an insert in the tool is drawn out so that the volume of the mould increases and the pressure is reduced. The gas and the compound are thereby able to expand. Normal degrees of expansion are 20–30%.

There are several special injection molding processes which, in principle, may be classified as low pressure or high pressure injection molding. An example of this is the "Gas counterpressure method". Here the tool cavity is first filled with gas under high pressure. The plastic compound containing unexpanded gas is injected into the mold cavity which, due to the gas in the cavity, is not filled entirely with the compound. The gas in the cavity is then evacuated and the plastic compound expands with the lower pressure in the cavity. The tools for this process are expensive, and only a small degree of expansion is obtained. The products, however, can be made with relatively high volume, and the surface of the product can be made smooth.

Another process is the "Union Carbide process". In this process a combination of extrusion and injection molding is used, but it is actually a low pressure method. The bicomponent or sandwich method (ICI) makes it possible to produce products having two different plastic raw materials, e.g., hard outer skin with foamed core. The process is expensive, and the foaming slight. The co-injection method with expansion of the core material by drawing the mold plates in the tool apart (USM) has, in principle, the same advantages as the ICI method. There is normally achieved a foaming degree of from 5 to 30% with multi-component processes.

DESCRIPTION OF THE INVENTION

In those processes where the plastic compound in the plastic processing machine contains gas, either decomposed chemical blowing agent or physical gas, due to the required pressure on the plastic melt in the processing mathine to avoid expansion of the blowing agent before the melt has emerged from the nozzle, the plastic melt will be subjected to shear forces in the nozzle. This produces a velocity profile in the melt on leaving the nozzle that has a higher velocity in the middle zones than in the zones furthest out toward the nozzle walls. Because the exterior pressure and thus the pressure in the plastic compound is reduced after the nozzle, the plastic compound expands immediately. The expanded gas cells in the plastic, due to the velocity profile, are subjected to shearing and are easily torn to pieces so that the expanded plastic collapses.

The present invention exploits the phenomenon that, for chemical blowing agents, there is an interval between the time when a sufficient temperature is reached for the decomposition to start, and the time when the decomposition actually begins. In the plastic processing machine, which may be, for example, an injection molding machine, the plastic compound is subjected to heat so that it melts and its temperature rises above the decomposition temperature of the blowing agent system. Before the blowing agent has begun its decomposition, the plastic compound is fed into a closed mold cavity. In the cavity, which is filled up with the plastic compound, a pressure is exerted on the compound which is sufficiently high to prevent the blowing agent from expanding when it decomposes, or to allow it to expand only to an insignificant degree. It is also a condition for obtaining closed gas cells that the blowing agent in the decomposition phase does not expand, or expands only to an insignificant degree. Since one does not have blowing agent in gas form in the plastic compound either in the plastic processing machine or in the nozzle, the plastic can be worked without a particularly high pressure. Moreover, a velocity profile having a higher velocity for the compound in the middle of the matter stream than out toward the tool walls does not mean that the cells will be torn to pieces, as the blowing agent does not decompose until a later stage in a closed cavity. The closed mold cavity may be a static chamber with walls of, e.g., steel, metal, or of plastic of high viscosity, or one or more of the cavity walls may be movable so that the cavity may be expanded in the course of the injection of plastic compound so that new plastic compound must constantly be pressed into the cavity in order to maintain the necessary pressure.

The blowing agent system may contain, in addition to the chemical blowing agent, substances that, e.g., change the decomposition temperature or the decomposition rate for the chemical blowing agent (e.g., ZnO). The blowing agent system may also contain substances that react chemically exothermally or endothermally in accordance with achieved reaction temperature. Thus one is able, for example, to achieve more rapid decomposition of the chemical blowing agent, and one may select a chemical blowing agent that decomposes at a higher temperature than would otherwise have been possible.

The pressure in the plastic compound that is necessary in order to prevent the blowing agent from expanding during the decomposition phase varies with the blowing agent system, the temperatures and the amount of blowing agent. When, e.g., Azodicarbonamide is used, with zinc oxide as a "kicker", at a mass temperature prior to decomposition of 165° C., and with a blowing agent amount of 10 phr, it would usually be sufficient to have a mass pressure of about 150 bar to avoid the expansion or to maintain it at a sufficiently low level.

The time necessary to attain complete or nearly complete decomposition of the blowing agent is also dependent on factors such as the total blowing agent system, the temperature of the plastic compound, the pressure in the plastic compound, the amount of blowing agent and the plastic compound composition.

After the plastic compound has rested in the mold cavity for a sufficiently long time to attain the desired degree of decomposition of the blowing agent, the mold is opened. If the plastic compound is not cooled down prior to opening the mold, the plastic compound will immediately expand until equilibrium is reached between the blowing agent pressure in the compound and the tensions in the compound. In order to prevent deformation of the product when it is removed from the mold in a hot state, the mold must be opened very rapidly and the product removed without delay. If, however, the surface of the plastic product is cooled sufficiently before the mold is opened, the expansion can be restrained long enough for the plastic product to be taken out of the mold in accordance with a normal opening speed, and the product may optionally be placed in a different mold, which may be a cooling/expansion mold, before the product expands or before it has expanded to a substantial degree. In practice, the product will always expand somewhat, but with sufficient cooling the expansion will be so slight that the product will not be deformed and will expand to the desired size after having been removed from the mold, optionally after having been placed in an expansion mold. Even though the surface has been cooled down, the calorific capacity in the core of the product will normally be high enough that the surface will be heated up by it, i.e., after a short time, such that the product can expand.

The present technology also makes it possible to produce products of cellular plastic, having skin of unexpanded plastic, from the same plastic material as for the cellular plastic. After the plastic compound has been placed in the tool mold, at a temperature above decomposition temperature of the blowing agent system, it will take some time before the actual decomposition begins. This "start time" will vary with different parameters such as, e.g., temperature and blowing agent system. By cooling the plastic compound's surface in the mold before the decomposition has started, the decomposition at the surface can be prevented. After the plastic compound has been placed in the tool mold, at a temperature above decomposition temperature of the blowing agent system, it will take some time before the actual decomposition begins. This "start time" will vary with different parameters such as, e.g., temperature and blowing agent system. By cooling the plastic compound's surface in the mold before the decomposition has started, decomposition at the surface can be prevented and outer layer may be cooled down further so that the product undergoes only a limited expansion before it is removed completely from the mold.

The plastic product must normally have a higher viscosity on expansion than the viscosity of the plastic compound when it is injected into the mold cavity. If the viscosity is too low when the external pressure is reduced, there is a risk that the expansion in the plastic will take place too rapidly and to such a high degree that the cell walls of the plastic will not be strong enough and will not have enough flexibility for the closed gas cells to form in a satisfactory manner throughout the entire product. The viscosity of the plastic may be increased by cooling down the compound relative to the temperature of the compound on injection. This is normally done with amorphous thermoplastics such as, e.g., PVC, or with other thermoplastics having a favorable viscosity/temperature ratio. When crystalline, or partially crystalline, plastics are to be worked by means of the present process, one will often employ cross-linking of the plastic before the expansion takes place. The cross-linking can be done chemically, for example, using silane groups, with radiation, or, If a polyethylene plastic is used, for example, with peroxides.

Normally it would be a prerequisite that the plastic not be cross-linked in the plastic processing machine, due to the risk that the viscosity of the plastic might become too high for mechanical processing. When cross-linking with radiation is employed, therefore, the radiation will take place after the compound has been placed into the cavity.

Also when peroxides are used as a cross-linking agent, the cross-linking of the plastic must first take place in the mold cavity. Peroxides must have a certain temperature in order to be decomposed. Both the time elapsing from when this "start temperature" is attained until actual decomposition and cross-linking of the plastic begins, as well as the cross-linking time, are dependent inter alia on the type of peroxide and temperature. It is normal to introduce heat through the mold walls in the cavity in order to attain a sufficiently high temperature. In the process based on the present patent application, however, one can utilize the additional heat generated in the plastic compound by the exothermic decomposition of the chemical blowing agent, such that temperature of the plastic compound is raised to above the decomposition level for the peroxide in question. The degree of exothermic reaction associated with the decomposition of the chemical blowing agent can be regulated by, e.g., selecting different blowing agents, or by combining exothermic and endothermic chemical blowing agents, or by using different accelerators, or by changing the quantity ratios in the blowing agent system. The pressure level in the plastic compound also has considerable significance for the amount of heat generated with decomposition. One may also utilize possible additives in the blowing agent system which react chemically exothermally or endothermally to control the decomposition of the peroxide.

DESCRIPTION AND EXAMPLES OF PROCESS CONDITIONS AND PLASTIC COMPOSITIONS

Development of the present technology has been carried out using a relatively small injection molding machine. This does not mean that it would have been impossible to use a different plastic processing machine. such as, e.g., an extrusion machine.

In the developmental phase of the technology, light products of cellular plastic with closed cells have been produced from Polyvinyl chloride (PVC), from Ethylene vinyl acetate (EVA) and from Polyethylene (LDPE and MDPE). An injection molding machine of the brand Demag DC 80 was used, with a shot capacity of about 100 g and 80 tons closure pressure. The screw diameter of the injection moulding machine was 32 mm with an l/d ratio of 20, and the cylinder was equipped with three heating belts with a temperature control. The molding tool was a steel tool having about 80 ml of molding volume. It was equipped with oil tempering for temperature control. It was further equipped with sensors for measuring the temperature and pressure of the plastic compound.

| Example of a composition based on PVC. | |
|---|---|
| PVC, S-grade, K-value 58 | 100.0 phr |
| Paraffin wax | 0.8 phr |
| Glycerine ester | 0.4 phr |
| Calcium stearate | 0.7 phr |
| Butyl tin mercaptide | 2.0 phr |
| Sodium bicarbonate | 7.0 phr |
| Azodicarbonamide | 5.0 phr |
| Zinc-oxide | 2.0 phr |
| Polymethyl methacrylate | 8.0 phr |
| Dioctylphalate | 10.0 phr |
| Aluminum hydroxide | 2.5 phr |

The raw materials were well mixed in conventional manner in a high-speed blender where the temperature was brought up to 125° C., thereafter to be cooled down to about 50° C. before the compound was taken out of the blender. The mixture was fed into the intake hopper of the injection molding machine. The speed of the machine was about 100 rpm, and the cylinder's temperature setting was, from the hopper and forward: 110° C., 125° C., and 140° C. The temperature of the nozzle was set at 150° C. The total time in the machine for the plastic compound was about 50 seconds. The compound's temperature, however, was not raised to above the decomposition temperature for the blowing agent system until the last section of the injection molding machine, so that there was no—or only a negligible amount of—decomposition of the blowing agents in the machine.

The compound was well gelatinized after the processing in the injection moulding machine and had a temperature of about 155° C. as it was injected into the tool's mold cavity. The actual injection took about 3 seconds. The injection pressure was about 180 bar. The mold cavity walls had a temperature of 175° C. on injection. After about 2 minutes, the decomposition of the blowing agent began, and was essentially finished about 2.5 minutes after start. The plastic compound was then cooled down in the mold cavity to about 130° C. at the core of the compound, and to about 80° C. on the surface. The product was removed from the mold and expanded after a few seconds to a density of about 90 g/cm³ with uniform cell structure throughout the entire product. The gas cells were small and closed.

There were also produced products having an integrated skin of the PVC material. The skin was not foamed and the transition between unexpanded skin and the expanded cellular plastic in the rest of the product was relatively sharp. The thickness of the skin could vary in thickness from one part of the product to another. The skin was formed by having reduced the temperature in the mold walls to 120°-130° C. during the actual injection of the plastic compound into the mold cavity; i.e., below the decomposition temperature of the blowing agent system. In this way, the blowing agent system was "extinguished" in the outer layer, preventing this section of the plastic compound from being decomposed because the temperature of this compound was brought down below the blowing agent system's decomposition temperature before the decomposition started. After the decomposition of the rest of the product was finished, the plastic compound was cooled down to about 110° C. in the mold before the product was removed from the mold and expanded to a density of about 90 g/cm³.

| Example of a composition based on EVA. | |
|---|---|
| EVA, Melt index 4, VA content 13% | 100 phr |
| Azodicarbonamide | 5 phr |
| Sodium bicarbonate | 8 phr |
| Zinc-oxide | 2 phr |
| Aluminum hydroxide | 4 phr |
| 2,5-B-2,5-dimenthylhexyne-3, 45% | 4 phr |

2,5-B-2,5-dimenthylhexyne was added in order to cross-link the plastic compound. This type of peroxide having high decomposition temperature and long half-life at "normal" temperatures was selected In order to make certain that the decomposition temperature for the blowing agent system would be lower than the decomposition temperature for the cross-linking agent, otherwise there would have been a risk of cross-linking in the injection molding machine.

The plastic raw materials were blended using a blade mixer. The injection molding machine's heating belt was set at 125° C., 135° C. and 150° C. (from the hopper and forward). The machine's velocity was set at 110 rpm. The nozzle temperature was set at 155° C. The steel temperature of the tool was set at 170° C. This temperature was lowered to 130° C. after about 5 minutes. The plastic compound had a temperature of about 150° C. at the outlet of the injection molding machine before it was placed in the tool. Little or none of the blowing agent was decomposed, nor was there any visible decomposition of the peroxide. The compound was placed In the tool in about 3 seconds, and the injection pressure was 200 bar.

After about 2 minutes following injection, the blowing agent in the plastic compound was decomposed and the temperature of the compound rose to about 200° C. This temperature was high enough for a rapid decomposition of the peroxide s material. The decomposition of the peroxide was completed or substantially completed in the course of about 5 minutes.

Then the tool's steel temperature was regulated downward to 80° C., and the product was removed from the mold after 2 minutes. After a few seconds the product expanded to a product having a density of about 70 g/cm³, with small, totally uniformly distributed, closed cells. The product had no skin, but a cellular structure all the way out to the surface.

There were also produced EVA-based products having dense, unexpanded skin and with light cellular plastic in the rest of the product. This was done by placing the compound, as in the example above, into the tool at a temperature of about 150° C. The tool's steel walls had a temperature of about 130° C. on the injection of the compound, which was immediately cooled down at the surface to below the decomposition temperature for the blowing agent system. One thus obtained a product where neither the blowing agent nor the peroxide material was decomposed on the surface, whereas the rest of the product expanded to cellular plastic having a density of about 70 g/cm$^3$, with small, closed gas cells, uniformly distributed.

In all of the runs executed with the technical equipment described above, the product was removed from the injection mould and allowed to expand freely. In practice it will often be necessary to transfer the product from the injection mold to an expansion mold before the product expands, or before it has expanded to any particular degree. A final product is thus produced with more clearly defined exterior measurements. The degree of expansion, however, will be somewhat reduced by the fuse of expansion molds, because there will always be an overpressure in the product's blowing agent as the product is contained by the expansion mold prior to being cooled.

I claim:

1. A process for the production of products of light cellular plastic with closed cells from a plastic composition containing chemical blowing agent and, optionally, other process-regulative substances and additives, where the plastic composition is processed mechanically in a plastic processing machine to a well homogenized, melted plastic compound, and transferred directly to a form cavity, the process comprising the steps of:

transferring the plastic compound to the form cavity at a temperature above the decomposition temperature of the blowing agent in combination with optional decomposition regulative additives and at a time when the compound has reached a temperature sufficient for the blowing agent in the plastic compound to decompose, and before a time when decomposition starts, filling the form cavity fully with plastic compound and holding the temperature in the plastic compound in the form cavity higher than the decomposition temperature for the blowing agent in the plastic compound until a desired degree of decomposition of the blowing agent has been reached, holding the pressure in the form cavity sufficiently high to prevent the plastic compound from expanding when the blowing agent decomposes, and reducing the pressure in the form cavity after the desired degree of decomposition has been obtained in order to allow the plastic compound to expand.

2. The process as disclosed in claim 1, wherein the plastic composition contains decomposition-regulating additives for the chemical blowing agent, which react chemically exothermally or endothermally in the form cavity.

3. The process as disclosed in claim 1, comprising the further step of surface cooling the plastic product under high pressure in the closed cavity to a temperature below the decomposition temperature of the blowing agent before the decomposition of the chemical blowing agent starts.

4. The process as disclosed in claim 1, comprising the further step of surface cooling the plastic product in the form cavity to a temperature which gives the surface a stiffness and strength high enough to allow the plastic product to be removed from the cavity without any part of the product significantly expanding before the entire product is removed from the cavity.

* * * * *